US006139786A

United States Patent [19]

Corry

[11] Patent Number: 6,139,786

[45] Date of Patent: Oct. 31, 2000

[54] METHOD OF FORMING A FLEXIBLE MOLD AND RESULTING ARTICLE

[76] Inventor: Arthur A. Corry, 6832 Trail Blvd., Naples, Fla. 33963

[21] Appl. No.: 08/050,825

[22] Filed: Apr. 22, 1993

Related U.S. Application Data

[63] Continuation-in-part of application No. 07/477,414, Feb. 9, 1990, abandoned.

[30] Foreign Application Priority Data

Feb. 9, 1989 [GB] United Kingdom .................. 8902859

[51] Int. Cl.[7] .................................................. B29C 33/40

[52] U.S. Cl. ......................... 264/222; 264/226; 264/313; 264/334; 264/338; 44/535; 425/2; 425/176; 425/440; 425/DIG. 44

[58] Field of Search ............................ 44/535, 598, 600; 425/84, 85, 2, 176, 440, DIG. 44; 264/86, 87, 69, 101, 122, 301, 305, 517, 571, 222, 226, 313, 334, 338; 249/55, 157; 162/218, 231, 380, 382

[56] References Cited

U.S. PATENT DOCUMENTS

| | | | |
|---|---|---|---|
| 1,050,535 | 1/1913 | Hartung | 44/435 |
| 1,398,760 | 11/1921 | Allen | 264/86 |
| 1,611,699 | 10/1926 | Wagner | 126/92 |
| 2,625,728 | 1/1953 | Eschenbrenner | 425/85 |
| 2,762,362 | 9/1956 | Nielsen | 126/92 |
| 2,779,058 | 1/1957 | Hyde | 249/55 |
| 3,070,485 | 12/1962 | Strickland | 44/13 |
| 3,183,143 | 5/1965 | Harris | 264/571 |
| 3,377,229 | 4/1968 | Bryan | 428/18 |
| 3,674,302 | 7/1972 | Mutch | 294/118 |
| 3,686,070 | 8/1972 | Williams | 264/87 |
| 3,726,651 | 4/1973 | Ronden | 44/435 |
| 3,880,611 | 4/1975 | Weiss | 44/435 |
| 3,895,998 | 7/1975 | Haywood et al. | 162/231 |
| 3,980,414 | 9/1976 | Shannon et al. | 425/85 |
| 4,040,796 | 8/1977 | Vincent et al. | 44/435 |
| 4,179,269 | 12/1979 | Yates | 44/435 |
| 4,233,348 | 11/1980 | Corry | 428/15 |
| 4,252,759 | 2/1981 | Yamanas et al. | 425/84 |
| 4,308,032 | 12/1981 | Benson | 44/535 |
| 4,313,789 | 2/1982 | Frahme | 264/87 |
| 4,436,526 | 3/1984 | Holder | 44/14 |
| 4,578,826 | 4/1986 | Adiletta | 264/87 |
| 4,683,028 | 7/1987 | Waller et al. | 162/382 |
| 4,877,417 | 10/1989 | Crace | 44/535 |

FOREIGN PATENT DOCUMENTS

| | | | |
|---|---|---|---|
| 2140552 | 5/1990 | Japan | 264/571 |
| 2032096 | 4/1980 | United Kingdom . | |
| 2187995 | 9/1987 | United Kingdom | 264/87 |

*Primary Examiner*—Margaret Medley

[57] ABSTRACT

A method of forming a flexible mold (12) and resulting article is provided where a model (10) having the contour of the article to be molded is provided. The model (10) is partially encapsulated within a flexible and substantially liquid impervious layer (14). The combined model (10) and liquid impervious layer (14) is immersed into a curable liquid composition and handle members (36, 38) are inserted into the curable liquid composition. The curable liquid composition (34) is cured having the handles (36, 38) embedded within the composition (34) and subsequent to curing, forms a solid flexible mold encompassing structure (44). Handle members (36, 38) are actuated to release the model (10) from the layer (14) to form the flexible mold (12) for the article to be produced.

9 Claims, 5 Drawing Sheets

METHOD OF FORMING A FLEXIBLE MOLD AND RESULTING ARTICLE

REFERENCE TO RELATED APPLICATIONS

This Patent Application is a Continuation-in-Part application of U.S. Ser. No. #07/477,414, filed on Feb. 9, 1990, now abandoned.

BACKGROUND OF THE INVENTION

1. Field of the Invention

This invention is directed to a method of forming a flexible mold and a resulting article. Particularly, this invention is directed to the formation of a flexible mold which may either be manually actuated, or automatically actuated to release a model from the mold subsequent to the mold being formed. More in particular, this invention is directed to a method of forming a flexible mold, wherein a model is used having a particular outer surface contour with a flexible and liquid impervious layer at least partially encapsulating the model. Still further, a pure latex layer is used to partially encapsulate the model prior to immersion of the combined model and latex layer into a curable liquid composition. Still further, the subject invention relates to a method of forming a flexible mold wherein a model with a partially encapsulating latex layer is inserted into a polyurethane resin composition with handle members being embedded therein. Still further, this invention relates to a method of forming a flexible mold where a flexible and solid mold encompassing structure is formed around a cavity where the solid and flexible mold encompassing structure may be deformed to allow easy removal of the model. More in particular, this invention directs itself to a method of forming a flexible mold which is unitary in nature and is formed in one-piece formation and can be manipulated to allow easy removal of both a model during formation of the flexible mold, as well as removal of an article formed during a molding process.

2. Prior Art

Molds and articles molded therefrom are well-known in the prior art. However, prior art molds were generally formed of more than one section that interlock and required operator intervention to open the various sections, remove the product being produced, and then re-assemble the interlocking parts. This did greatly increase the labor and time associated therewith for construction of both the molds and the articles being produced therefrom.

With regard to prior art mold sections of complicated shapes and designs, such prior art molds required a large amount of skill and may take from two to four weeks on each mold, dependent on the size and nature of the complicated design to produce. Prior art molds needed persons having a high degree of training to attain a reasonable level of skill to produce such molds.

Additionally, prior art molds having complicated shapes formed of separable interlocking sections left split lines on the articles which are not a concern of the subject system, which provides for a one-piece mold.

Prior art mold designs with complicated contours and interlocking or separable portions could not lend themselves to automation, since operator intervention has always been a necessity in the production of molded articles formed therefrom.

SUMMARY OF THE INVENTION

This invention provides a method of forming a flexible mold and resulting article formed from the flexible mold. Initially, a model of an article to be produced is provided and the model is partially encapsulated within at least one flexible and substantially liquid impervious layer. The partially encapsulated model is then immersed in a curable liquid composition and a pair of handle members are inserted into the curable liquid composition. The curable liquid composition is then cured having the handle members embedded therein to form a solid flexible mold encompassing structure. The handle members may then be displaced to release the model from the flexible and substantially liquid impervious layer to form the flexible mold for an article to be produced.

An object of the present invention concept is to provide a singular, unitary and one-piece flexible mold which is easily used either in a manual or automated mode of operation.

A further object of the subject invention is to provide a simple and faster method of producing a mold than has been required in prior art mold construction techniques.

A still further object of the subject invention is to reduce the extremely high cost of mold construction and replacements therefor.

Another object of the invention is to remove expensive material mold construction apparatus in order that molds may be formed in a simple, efficient, and relatively inexpensive manner.

A still further object of the subject invention is to produce a mold that, even for complicated shapes and contours, does not have split lines formed on the final product being molded.

Another object of the invention is to provide a mold constructed of a single, unitary, flexible material that may remain in a static position with the article to be produced internal to the mold itself and only when pressure is applied to force open the mold will the article be removed therefrom by gravity assist. Additionally, when the expelling force is removed, the mold returns to its original shape and contour ready for the next article to be formed.

DESCRIPTION OF THE PREFERRED EMBODIMENTS

Referring now to FIGS. 1–11, there is shown a method of forming a flexible mold and resulting article attained therefrom. The flexible mold 12, as is more clearly seen in FIGS. 7 and 8, enables a wider range of complicated shapes and configurations to be molded of either ceramic or other fibrous materials than those known in the prior art. Additionally, as will be seen in following paragraphs, flexible mold 12 is of simple configuration and easily formed about model 10, which greatly reduces the manufacturing, as well as design phases of prior molds. Still further, flexible mold 12 allows for both a manual production line, as well as a fully automatic production line in production of the final articles being molded.

Figure 1:
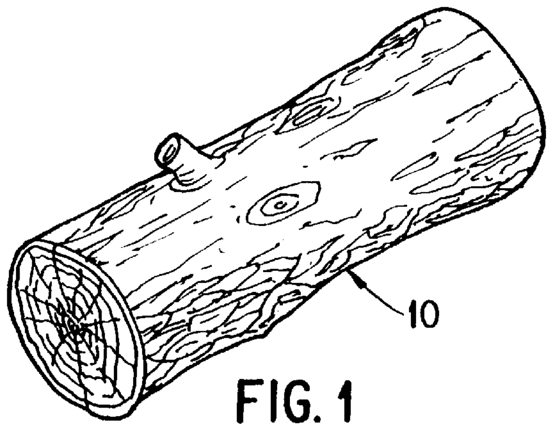
FIG. 1 is a perspective view of a model used in the subject invention concept.
Figure 2:
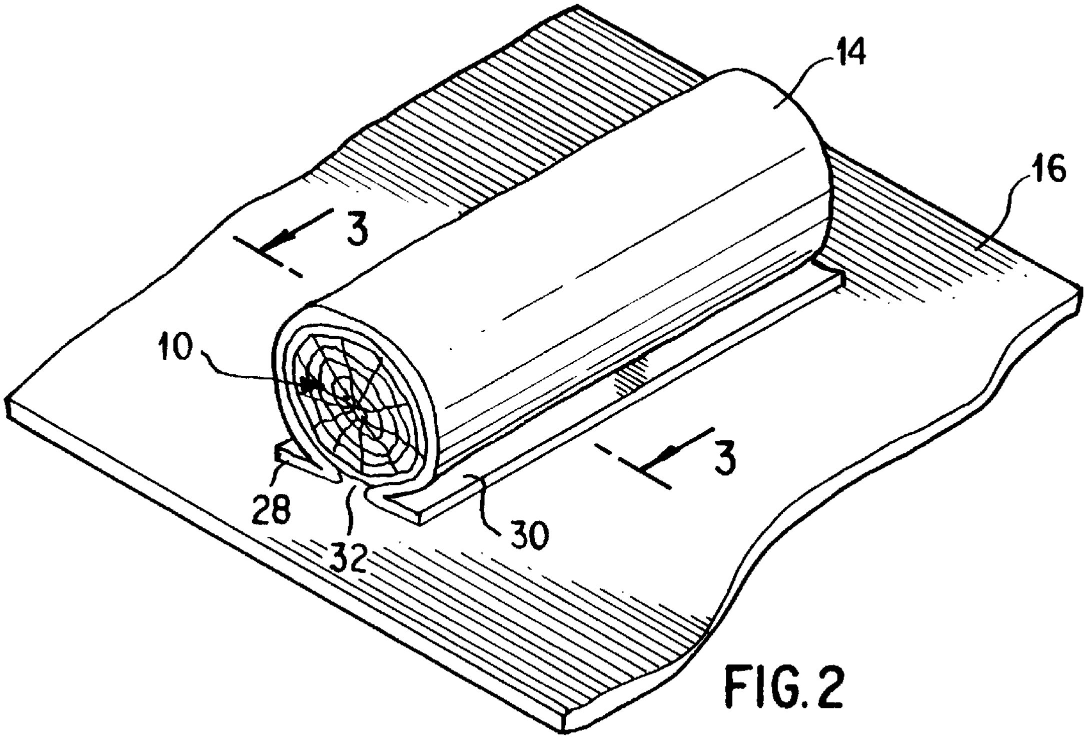
FIG. 2 is a perspective view of a model being partially encapsulated by a flexible and liquid impervious layer positioned on a base surface.
Figure 3:
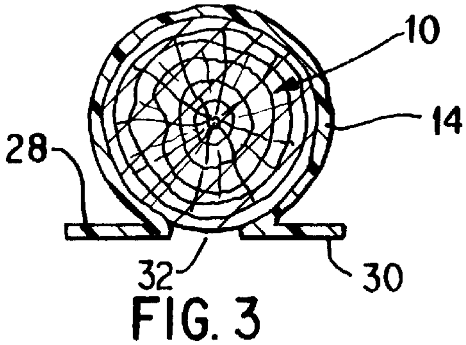
FIG. 3 is a cross-sectional view of the model and the layer partially encapsulating the model.

Referring now to FIG. 1, there is shown model 10 which may be an article such as a log shown, or other article having a complicated external contour. Model 10 may be initially formed of some type of metal, plastic, or fibrous material, not important to the invention concept, with the exception that it maintain its structural integrity within the environment, as herein described. The important consideration is that model 10 includes a positive impression of the outer contour of article 10 to be produced from flexible mold 12.

Initially, after establishment of model 10, model 10 is partially encapsulated within at least one flexible and substantially liquid impervious layer 14, as shown in FIGS. 2–5. Model 10 is placed on a floor member 16 of open top container 18. Open top container 18 includes opposing sidewalls 20 and 22, opposing end walls 24 and 26, as well as floor member 16. Open top container 18 may be formed of rigid plastic, wood, plastic materials, or some like composition not important to the invention concept, with the exception that such is fluid tight and will be able to maintain liquids inserted therein.

Referring back to FIGS. 2 and 3, flexible and substantially liquid impervious layer 14 is formed or wrapped around model 10, as is shown. Flexible and substantially liquid impervious layer 14 is contoured around model 10 to provide opposing flanges 28 and 30, which lie contiguous floor member 16 and extend throughout the longitudinal length of model 10.

In this manner, flexible and substantially liquid impervious layer 14 is contiguously interfaced with a top and side surface areas of model 10, as is shown, while maintaining non-encapsulated lower surface area 32 for purposes which will be described in following paragraphs. Thus, non-encapsulated area 32 allows a predetermined lower surface area of model 10 to lie adjacent floor member 16.

Flexible and liquid impervious layer 14 is generally formed of a flexible closed cell elastomer composition. The composition which has been successfully used is latex, which is a milky colloid in which natural or synthetic rubber or plastic is suspended in water. Additionally, when latex layer 14 is used, the approximate overall thickness range having successfully been accomplished is within the thickness range between 1.0 mm to 5.0 mm. A preferred overall thickness range for layer 14 is between 2.0–4.0 mm, which has been found to be sufficiently thin to accept small impressions from model 10, while maintaining the structural integrity necessary in the forming of flexible mold 12.

It is to be understood that a plurality of layers 14 may be formed over model 10, and it is not necessary to the inventive concept as herein described that only one layer 14 be provided for partial encapsulation of model 10.

Figure 4:
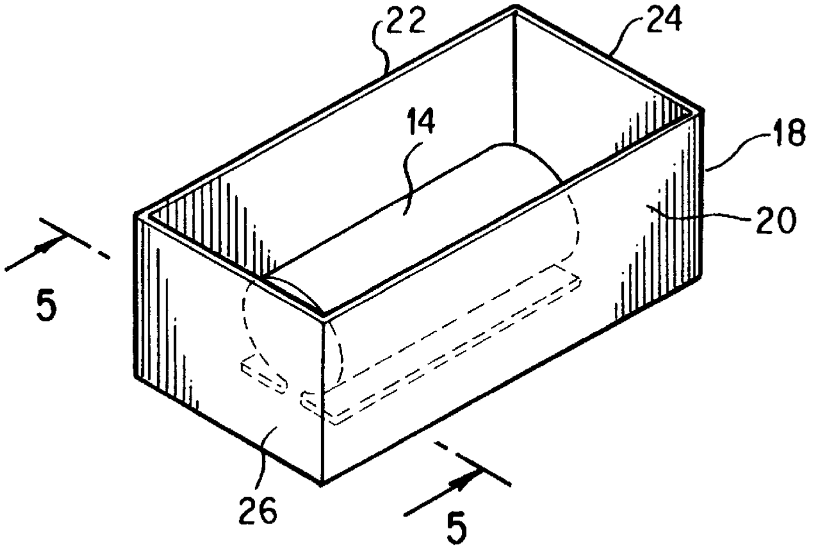
FIG. 4 is a perspective view of the combined model and partially encapsulating layer being inserted within an open-topped box.
Figure 5:
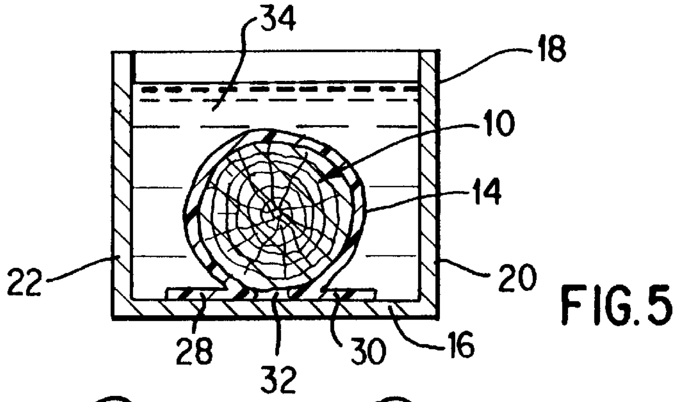
FIG. 5 is a cross-sectional view of the model and partially encompassing layer immersed within a curable liquid composition inserted into the open-topped container.

Thus, as previously described, open top container 18 has been established for insertion of partially encapsulated model 10 therein, as is shown in FIGS. 4 and 5. Partially encapsulated model 10 is then positioned on floor member 16 of open top container 18. Partially encapsulated model 10 is then immersed into curable liquid composition 34, as is shown in FIG. 5. Curable liquid composition 34 is inserted into open top container 18 to a level which fully encapsulates partially encapsulated model 10, as is shown. Curable liquid composition 34 must have a level above the top surface of at least partially encapsulated model 10, in order to provide an operable structure for flexible mold 12, as will be further described in following paragraphs. It is to be understood that partially encapsulated model 10 with enclosing layer 14 may be immersed into curable liquid composition 34 initially, or in the alternative, curable liquid composition 34 may be poured into open top container 18 for complete encapsulation of partially encapsulated model 10 within curable liquid composition 34.

Curable liquid composition 34 may be formed of a polyurethane resin, which is a resin resulting from the reaction of diisocyanates such as toluene diisocyanate, with a phenol, amine, or hydroxylic or caroboxylic compound to produce a polymer with free isocyanate groups. The particular type of polyurethane being used is not important to the inventive concept as herein described, with the exception that it is preferred that such be curable at room temperatures and under one atmosphere of pressure.

Figure 6:
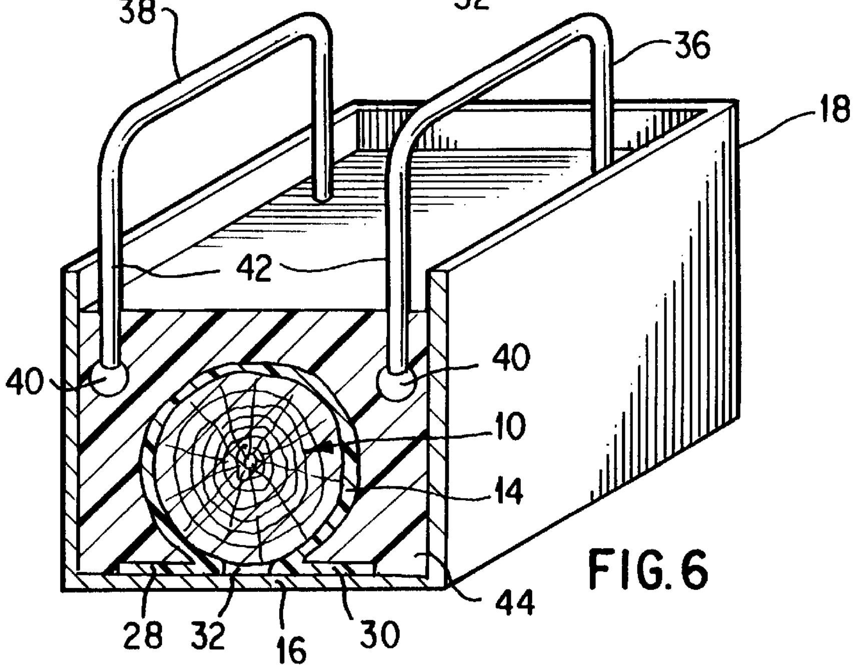
FIG. 6 is a perspective view, partially in cross-section, showing handles inserted and maintained within the solid flexible mold encompassing structure attained by the curing of the curable liquid composition.
Figure 7:
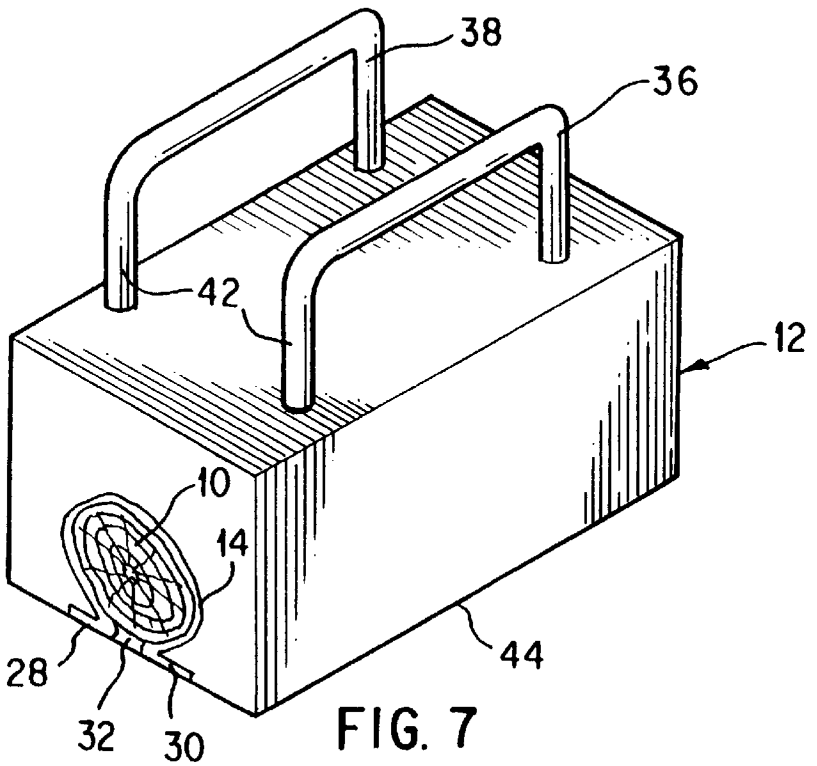
FIG. 7 is a perspective view of the solid and flexible mold encompassing structure removed from the open-topped container.
Figure 8:
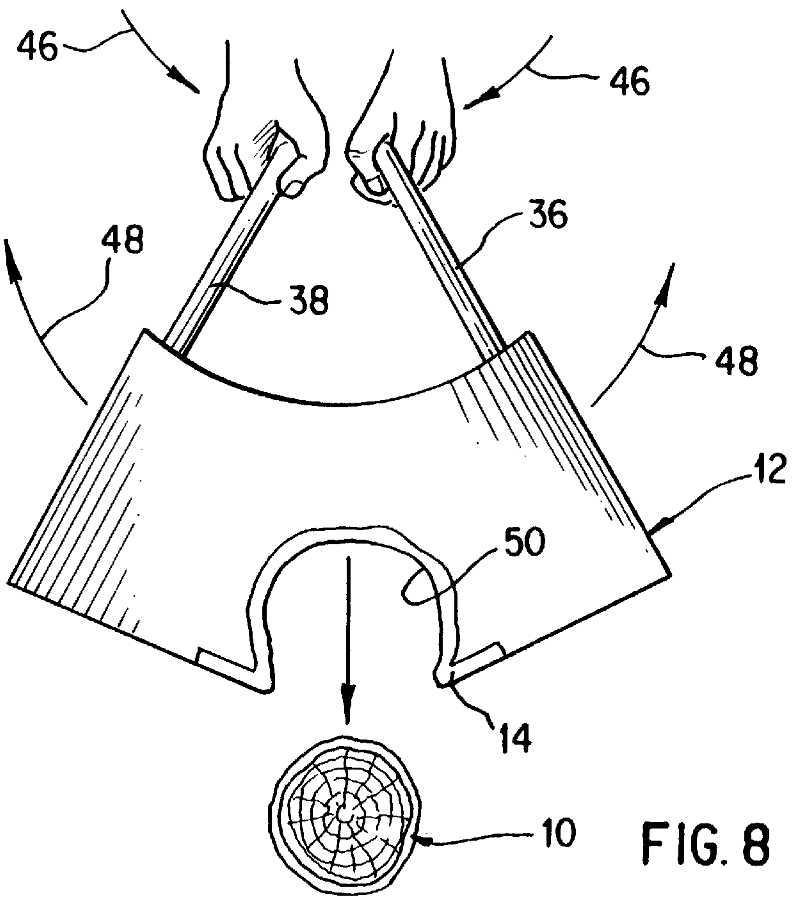
FIG. 8 is an elevational view of the flexible mold being deformed to allow release of the model.

Referring to FIGS. 6, 7 and 8, handle members 18 are inserted into curable liquid composition 34 prior to the setting process or during the setting process and prior to curable liquid composition becoming fully cured or set, as is seen in FIG. 6. Handle members 36 and 38 may include end portions 40 which have a wider cross-sectional area than corresponding legs 42, which allows handles 36 and 38 to be rigidly secured within the structure of flexible mold 12 subsequent to the setting of curable liquid composition 34. In this manner, flexible mold 12 may be flexed or handled by operators without handles 36 and 38 slipping out of the main structure of flexible mold 12.

Subsequent to the setting of curable liquid composition 34, liquid composition 34 takes the form of solid flexible polyurethane structure 44 shown in FIG. 6. At this phase of the forming of flexible mold 12, flexible polyurethane structure 44 is still maintained within open top container 18 and as is clearly seen, positioned within solid flexible polyurethane structure 44 is model 10 with latex layer or layers 14 formed therearound.

Solid flexible polyurethane structure 44 is then removed from open top container 18, as is shown in FIG. 7. Handles 36 and 38 may be manually displaced in the direction of arcuately directed directional arrows 46, either manually or through an automatic procedure. Displacement of handles 36 and 38 in the direction of arcuate directional arrows 46 forces displacement of flexible mold 12 in the direction of directional arrows 48, which then opens non-encapsulated area 32 and allows model 10 to be dropped by gravity assist while maintaining latex layer 14 attached to the solid flexible polyurethane structure 44. This then forms internal cavity 50 having the negative impression of model 10, as has been previously described. It is to be understood that the release of model 10 as shown in FIG. 8 is for illustration only. One end of model 10 may be placed on a base surface and handles 36 and 38 actuated in a plane normal to that shown for placement of model 10 on the base surface without the aid of gravity assist.

In this manner, there is provided flexible mold 12 which is far advantageous to prior art molds, in that the finished products provide for visual appearance improvement, since flexible mold 12 transfers subtle details of intricate designs onto an inner surface of the mold which assures a maximization of the subtle design characteristics of an article to be reproduced. As has been described in previous paragraphs, the concept and flexible mold 12 construction is formed out of two different types of flexible compositions. The inner sleeve material or latex layer 14 has a preferred thickness between 2.0 mm–4.0 mm, and is used since it will produce almost a perfect mirror image of the model 10 to be copied. The general softness of the pure latex composition subsequent to setting assures a simple and easy release in production of articles formed from flexible mold 12, even when the article required to be reproduced has an intricate, subtle, and/or complicated design or configuration. The main body or outer shell material structure 44 which is the solid flexible polyurethane structure, forms the large volume section of flexible mold 12, and is strong enough to accept the loads imparted during operation, but maintains flexibility.

It is to be further understood that handle members 36 and 38 are shown positionally placed on opposing sides of model 10, however, particular placement of handle members 36 and 38 are not important to the inventive concept, with the exception that they be provided for predetermined designs in a placement position which will allow flexing and deformation of flexible mold 12 to permit removal or release of model 10 from internal solid flexible polyurethane structure 44.

Figure 9:
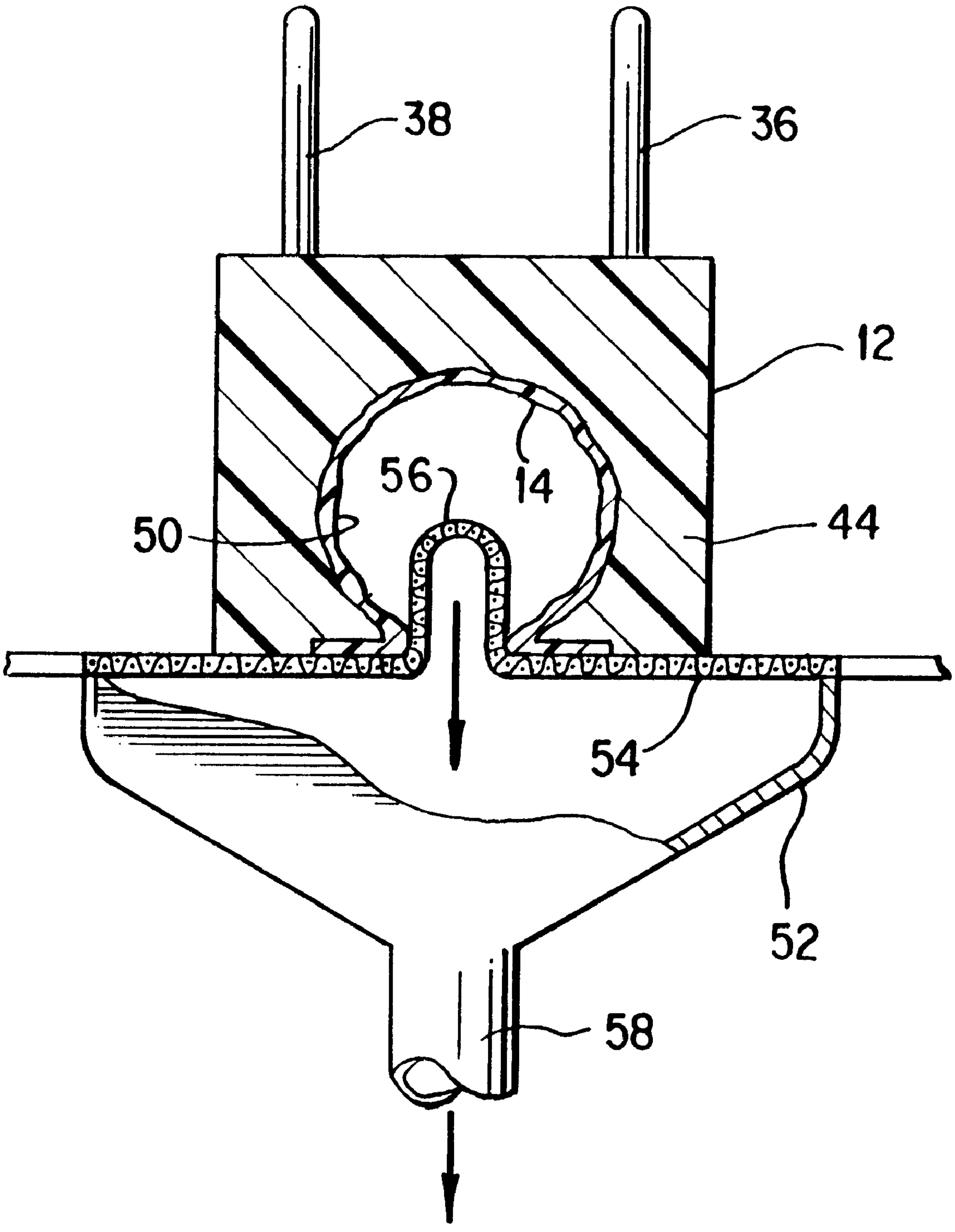
FIG. 9 is an elevational view partially in cross-section, showing the flexible mold mounted on a suction box.
Figure 10:
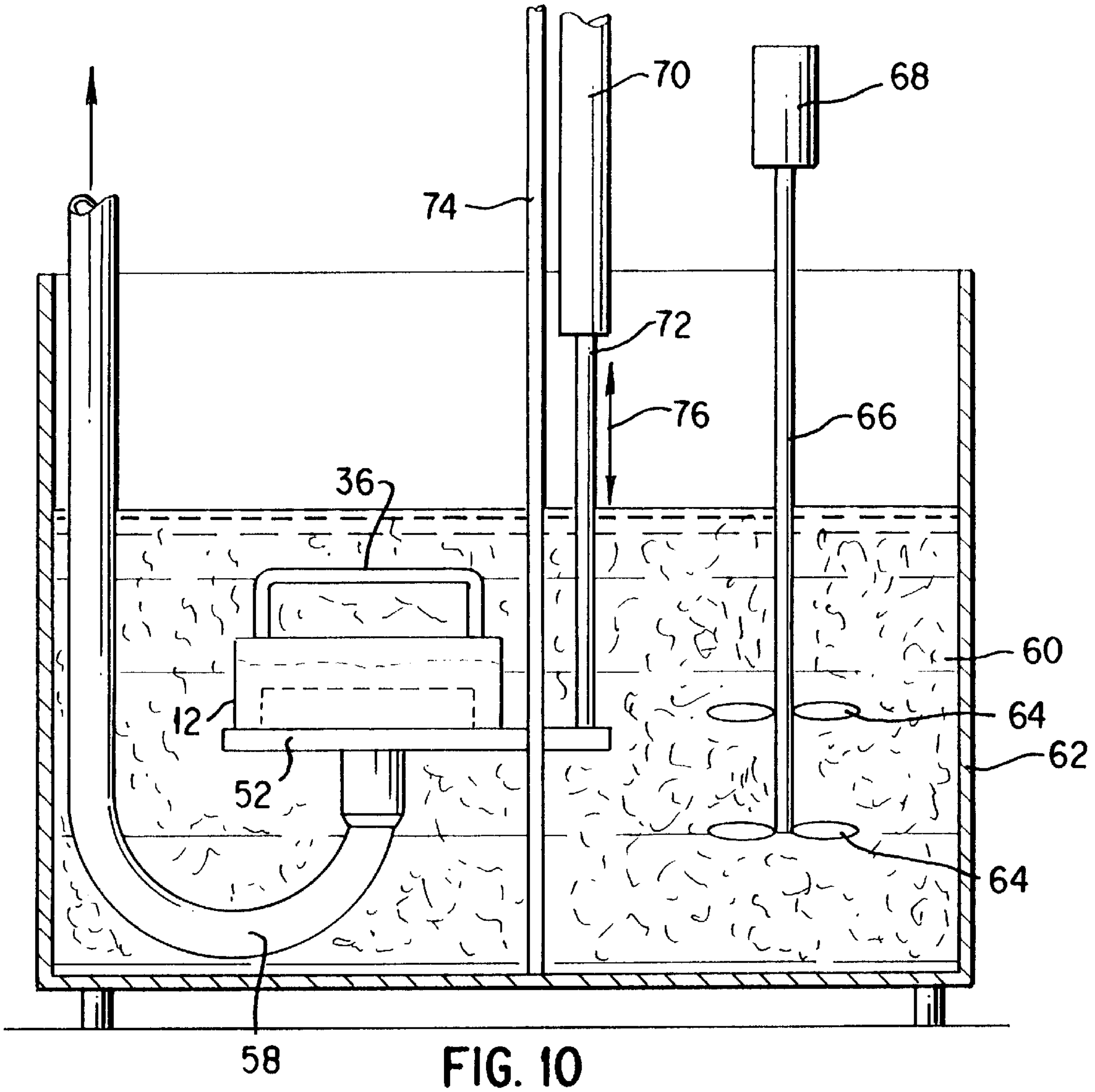
FIG. 10 is a schematic view of the apparatus used in formation of an article from the flexible mold; and, FIG. 11 is a cross-sectional view showing the flexible mold mounted on the suction box.
Figure 11:
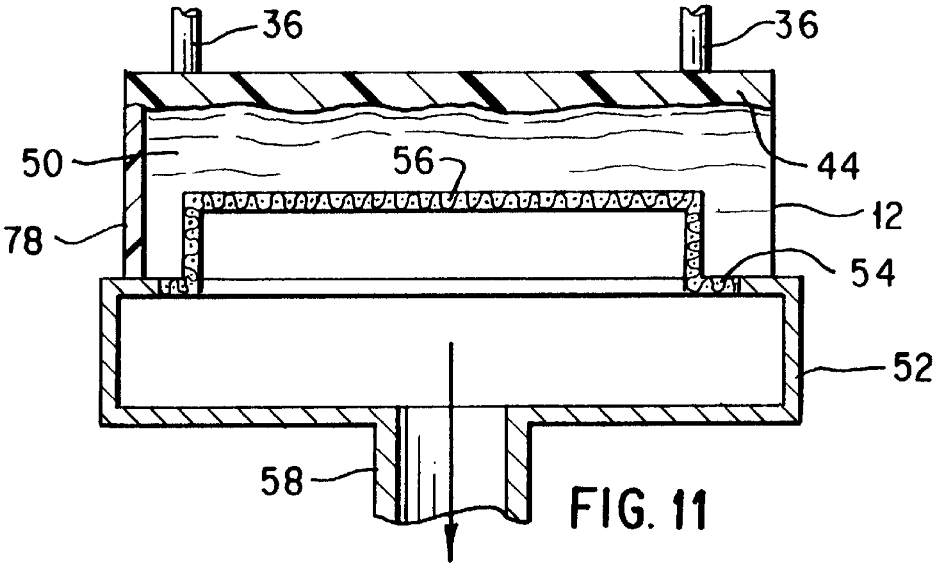

Referring now to FIGS. 9–11, there is shown the method of forming a resulting article from flexible mold 12. Once flexible mold 12 and the resulting solid flexible polyurethane structure 44 has been formed in accordance with previous paragraphs, flexible mold 12 may be mounted on suction box 52, as is shown in FIG. 9. Suction box 52 includes an upper end having a screen section 54 serving as a base surface upon which flexible mold 12 is positionally located. Screen section 54 may include a central perforate section 56 which may or may not extend into mold cavity 50, as is shown in FIG. 9. Thus, although central perforate section 56 is shown extending into cavity 50 for illustrative purposes, it is to be understood that section 56 may be substantially co-planar with screen section 54. Extending below suction box 52 is suction conduit 58, which creates a pressure drop to cause slurry 60 to be drawn into mold cavity 50, and allow the finished article to attain the external contour of model 10. Referring now to FIG. 10, there is shown the apparatus and general configuration of the system for forming the articles from flexible mold 12. The apparatus includes tank 62 which contains slurry 60 within which flexible mold 12 and suction box 52 is mounted, as is shown. Slurry 60 may be formed of an inorganic composition and particularly of a composition of ceramic fibers and an inorganic flocculating agent, if so desired for production of a particular article, such as an artificial log.

Agitating blades 64 are fixedly coupled to rotatable shaft 66, which is in turn coupled to a standard motor 68 to maintain constant agitation of slurry 60 within tank 62. Flexible mold 12 and suction box 52 are displaceably coupled to vertical guide rod 74, which merely allows guidance of the combined structure of flexible mold 12 and suction box 52 in reversible vertical direction 76, and maintaining some stability in other directions. Hydraulic ram 70 is displaceably coupled to hydraulic displacement rod 72, which is fixedly secured to a base of suction box 52 at a lower end thereof, as shown in FIG. 10. In this manner, the combination of suction box 52 and flexible mold 12 may be reversibly displaced in vertical direction 76 above the level of slurry 60 for removal of flexible mold 12, or alternatively, for submersion beneath the slurry level 60 for suctioning slurry 60 into internal cavity 50. Conduit 58 may be a rubber hose, or other flexible member, which would allow displacement of the combined structure of suction box 52 and flexible mold 12 to be reversibly displaced in vertical direction 76.

Additionally, plug 78, as shown in FIG. 11, may be inserted within one end of cavity 50 to allow build-up of slurry within cavity 50 during the time that suction box 52 is actuated and is drawing slurry 60 into cavity 50 for the purposes of forming the final molded article.

In overall operation, tank 62 is at least partially filled with slurry 60 which generally may be formed of an entirely inorganic composition consisting of chopped ceramic, or other heat comparable heat resisting fibers, water, and an inorganic flocculent, such as colloidal silicate or other material. In many articles formed herein, slurry 60 contains no organic materials which have been used previously in prior art systems. Slurry 60 may be maintained in suspension by use of an agitator system as previously described for the combination of the motor 68, driving shaft 66, and agitator blades 64. A highly active agitator system does tend to break up the fibers, however, the creation of a fine slurry merely improves the process and has not been found to have any deleterious effects.

With the assembly of the suction box 52 and flexible mold 12 immersed in the agitated slurry, suction is applied to conduit or flexible tube 58 which draws slurry into mold cavity 50, as has been described.

Water passes through the perforate portions 54 and 56, and is drawn away through tube 58. Fibers in slurry 60 generally build up and form a mass within cavity 50. The drop in pressure from within cavity 50 draws the fibers into close and intimate engagement with the irregular formations on the surface wall of cavity 50 which creates a subtle design reproduction.

When cavity 50 has been filled with the fibers of slurry 60, immersion is maintained for a short period of time to consolidate the body of fibers of slurry 60. Thereafter, suction box 52 and flexible mold 12 is raised above the level of slurry 60 and then may be maintained under vacuum or suction conditions for a short period of time. The suction is discontinued and flexible mold 12 may be lifted from suction box 52 by handles 36 and 38. The final article may be released from flexible mold 12 in the same manner as was described in FIG. 8 for removal of model 10. The removal of the final article may either be manual or automatic.

Where manual production of the article is being provided, flexible mold 12 is removed from suction box 52 by handles 36 and 38. Handles 36 and 38 are the extension of the mold internal reinforcement embedded in the main body 44 of flexible mold 12. It has been found that average male/female hand pressure has sufficient force to displace handles 36 and 38 inwardly/outwardly to open flexible mold 12 in opposing directions, which allows the article to drop onto either a tray or moving belt by gravity assist. Subsequently, flexible mold 12 is once again mounted on suction box 52 by the operator for the next article to be molded in the same sequence as has previously been described.

Where automatic production of articles is necessitated, such will fully automate a production line and only requires the introduction of actuatable cylinders such as pneumatic cylinders to replace the manual hand pressure and a well-known three logic system control panel, which would drive the handles to operating conditions of open; dwell; and close. Single or composite multi-impression product cycles may be attained through the automation process.

With reference to prior art automation type systems, the subject flexible mold 12 is highly advantageous, in that prior art mold automation could not be achieved due to the fact that such are generally formed of more than one section that interlock each to the other and require operator intervention to open the various sections, remove the article to be molded, position such on a tray, and then re-assemble the interlocking parts. Subsequent to this sequence, the assembled mold is positioned on the suction box and finally secured for the next product to be molded. Although such may or may not be possible to be constructed, such a system would be extremely complicated to construct, as opposed to the simple automation process scheme as herein devised for flexible mold 12.

For certain specific mold preparations, flexible layer 14 may be dispensed with and model 10 located in molding relationship directly within curable liquid 34. In this embodiment, main body or structure 44 is formed directly around model 10 and in contiguous relationship therewith.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended Claims.

What is claimed is:

1. A method of forming a flexible mold for use in producing a molded article, including the steps of:

(a) providing a model of an article to be produced, said model having top, bottom and side surface area portions forming a predetermined outer contour;

(b) providing at least one flexible and liquid impervious layer;

(c) partially encapsulating said model within said at least one flexible and liquid impervious layer to form a reverse image of said predetermined outer contour, said partially encapsulated model having a lower portion;

(d) providing a container having a floor member;

(e) inserting said partially encapsulated model into said container, said lower portion of said partially encapsulated model being placed in contiguous overlaying relationship with said floor member of said container;

(f) providing a curable liquid polymer composition;

(g) pouring said curable liquid polymer composition into said container for encapsulation of said partially encapsulated model within said curable liquid polymer composition;

(h) inserting a pair of handle members into said curable liquid polymer composition to a predetermined depth, said predetermined depth being less than a depth of said liquid impervious layer;

(i) curing said curable liquid polymer composition having said pair of said handle members embedded therein to form a solid flexible mold encompassing member adhered to said liquid impervious layer for forming a flexible mold structure;

(j) removing said flexible mold structure from said container; and, (k) displacing said handle members each toward the other to release said model from said flexible mold structure to form a cavity therein for use in forming said molded article as a replica of said model.

2. The method of forming a flexible mold for use in producing a molded article, as recited in claim 1 where the step of partially encapsulating said model includes the steps of:

(a) contiguously interfacing said flexible and liquid impervious layer with said top and side surface area portions of said model; and, (b) maintaining said lower surface area portion of said model non-encapsulated.

3. The method of forming a flexible mold for use in producing a molded article as recited in claim 2, where said flexible and liquid impervious layer is formed of a flexible closed cell elastomer composition.

4. The method of forming a flexible mold for use in producing a molded article as recited in claim 3 where said flexible closed cell elastomer compositions is latex.

5. The method of forming a flexible mold for use in producing a molded article as recited in claim 3 where said flexible closed cell elastomer composition layer includes an approximate thickness range between 1.0 mm to 5.0 mm.

6. The method of forming a flexible mold for use in producing a molded article as recited in claim 1 where said curable liquid composition is formed of a polyurethane resin composition.

7. The method of forming a flexible mold for use in producing a molded article as recited in claim 6 where the step of inserting said pair of handle members into said polyurethane resin composition includes the step of inserting said handle members into said polyurethane resin composition on opposing sides of said partially encapsulated model.

8. The method of forming a flexible mold for use in producing a molded article as recited in claim 7 where said step of curing said polyurethane resin composition includes permitting said polyurethane resin composition to set for a predetermined time to form said solid flexible mold encompassing member.

9. A method of forming a flexible mold for producing a molded article, including the steps of:

(a) providing a model of an article to be produced, said model having a lower portion and a predetermined outer contour;

(b) providing a container having a floor member;

(c) inserting said model into said container, said lower portion of said model being placed in contiguous overlaying relationship with said floor member of said container;

(d) providing a curable liquid polymer composition;

(e) pouring said curable liquid polymer composition into said container for encapsulation of said model therewith;

(f) providing a pair of rigid handle members;

(g) inserting said pair of rigid handle members into said curable liquid composition;

(h) curing said curable liquid polymer composition having said pair of said rigid handle members embedded therein to form a solid flexible mold encompassing member;

(i) removing said solid flexible mold encompassing member from said container; and, (j) displacing said handle members to release said model from said solid flexible mold encompassing member to form a cavity therein having a reverse image of said predetermined outer contour for use in forming said molded article as a replica of said model.

* * * * *